(12) United States Patent
Ming

(10) Patent No.: US 12,058,179 B2
(45) Date of Patent: Aug. 6, 2024

(54) COMPUTING POWER NETWORK SYSTEM

(71) Applicant: Zhongxing Ming, Zhuozhou (CN)

(72) Inventor: Zhongxing Ming, Zhuozhou (CN)

( * ) Notice: Subject to any disclaimer, the term of this patent is extended or adjusted under 35 U.S.C. 154(b) by 239 days.

(21) Appl. No.: 17/895,083

(22) Filed: Aug. 25, 2022

(65) Prior Publication Data
US 2024/0064175 A1 Feb. 22, 2024

Related U.S. Application Data

(63) Continuation of application No. PCT/CN2022/112714, filed on Aug. 16, 2022.

(51) Int. Cl.
*H04L 9/40* (2022.01)
*G06F 9/48* (2006.01)

(52) U.S. Cl.
CPC ............ *H04L 63/20* (2013.01); *G06F 9/4893* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 9,378,065 B2 * | 6/2016 | Shear ............... | G06F 16/24575 |
| 9,904,579 B2 * | 2/2018 | Shear ................ | G06F 16/285 |
| 9,971,390 B1 * | 5/2018 | Becker ............... | G06F 1/329 |
| 11,228,616 B2 * | 1/2022 | Khan ................. | G06F 21/554 |
| 11,470,100 B1 * | 10/2022 | Christian ........... | H04L 63/102 |
| 2013/0042124 A1 * | 2/2013 | Isozaki ............... | H04L 63/20 |
| | | | 713/310 |
| 2016/0048846 A1 * | 2/2016 | Douglas .............. | G06F 16/23 |
| | | | 705/318 |
| 2016/0057133 A1 * | 2/2016 | Ashley ................ | H04L 63/20 |
| | | | 713/156 |

(Continued)

FOREIGN PATENT DOCUMENTS

| | | |
|---|---|---|
| CN | 112132447 A | 12/2020 |
| CN | 113900837 A | 1/2022 |

(Continued)

OTHER PUBLICATIONS

International Search Report dated May 10, 2023; PCT/CN2022/112714.
Written Opinion mailed May 10, 2023; PCT/CN2022/112714.

*Primary Examiner* — Kaveh Abrishamkar

(57) ABSTRACT

A computing power network system includes: a control center; distributed computing clusters; a domain name server; and a trusted resource management unit, including a contract server and a plurality of blocks; wherein the control center is configured to provide a service interface for a user terminal, and determine a scheduling policy for the distributed computing clusters; the domain name server is configured to receive a parsing request sent by the user terminal over the service interface, and determine, based on the parsing request and the scheduling policy, an IP address of a target computing cluster configured to perform a computing task of the user terminal; and each computing cluster in the distributed computing clusters is configured to uploads real service capability data thereof to the contract server, and the contract server is configured to send the credit assessment to the plurality of blocks.

15 Claims, 2 Drawing Sheets

(56) References Cited

U.S. PATENT DOCUMENTS

| | | | |
|---|---|---|---|
| 2017/0134402 A1* | 5/2017 | Boivie | G06F 21/53 |
| 2023/0274205 A1* | 8/2023 | Stets | G06Q 30/0631 |
| | | | 705/7.14 |

FOREIGN PATENT DOCUMENTS

| | | |
|---|---|---|
| CN | 114615180 A | 6/2022 |
| CN | 114816738 A | 7/2022 |
| WO | 2021190482 A1 | 9/2021 |

* cited by examiner

COMPUTING POWER NETWORK SYSTEM

CROSS-REFERENCE TO RELATED APPLICATIONS

This application is a continuation of International Application No. PCT/CN2022/112714, with an international filing date of Aug. 16, 2022, the entire contents of which are incorporated herein by reference.

TECHNICAL FIELD

The present disclosure relates to the technical field of cloud computing, and in particular, relates to a computing power network system.

BACKGROUND

As the computing technology and network technology surge, a computing power network is developed, which is a new information infrastructure centering on a computing power, based on network, and providing an integrated service. The goal of the computing power network is to gradually promote the computing power into a social-level service that is accessible at one point and pick and go, like hydropower.

Different from the traditional cloud computing environment, computing clusters of the computing power network are often distributed at different locations and equipped with heterogeneous hardware and operating systems, and often use different security management mechanisms. This makes the computing power network more vulnerable to data tampering, identity hijacking and other threats.

SUMMARY

Various embodiments of the present disclosure are intended to provide a computing power network system, to solve the problem that a computing power network has poor security in the related art.

The embodiments of the present disclosure provide a computing power network system. The computing power network system includes: a control center; distributed computing clusters; a domain name server; and a trusted resource management unit, including a contract server and a plurality of blocks; wherein the control center is configured to provide a service interface for a user terminal, and determine a scheduling policy for the distributed computing clusters; the domain name server is configured to receive a parsing request sent by the user terminal over the service interface, and determine, based on the parsing request and the scheduling policy, an IP address of a target computing cluster, in the distributed computing clusters, configured to perform a computing task of the user terminal, such that the user terminal sends the computing task to the target computing cluster over the service interface; the target computing cluster in the distributed computing clusters is configured to perform the computing task, and return a computing result to the user terminal; each computing cluster in the distributed computing clusters is configured to uploads real service capability data thereof to the contract server, and the contract server includes an assessing module, a reward and penalty module, and an executing module, wherein the assessing module is configured to determine whether to acquire an assessment indicator for an credit reward or credit penalty upon completion of a computing task by one of the computing clusters, the reward and penalty module is configured to determine a variation degree of a cluster credit value of the computing cluster based on the real service capability data, and the executing module is configured to generate, based on the assessment indicator and the variation degree of the cluster credit value, a credit assessment of the computing cluster in performing the computing task, and send the credit assessment to the plurality of blocks to store a credit record of the computing cluster; and the control center is further configured to acquire the credit record from the plurality of blocks to identify credit of the computing cluster.

BRIEF DESCRIPTION OF THE DRAWINGS

One or more embodiments are illustratively described by using a diagram that corresponds to the one or more embodiments in the accompanying drawings. These exemplary descriptions do not constitute any limitation on the embodiments. Elements that have the same reference numerals in the accompanying drawings are represented as similar elements. Unless specifically indicated, the diagrams in the accompanying drawings do not constitute any limitations on proportions.

DETAILED DESCRIPTION

Figure 1:
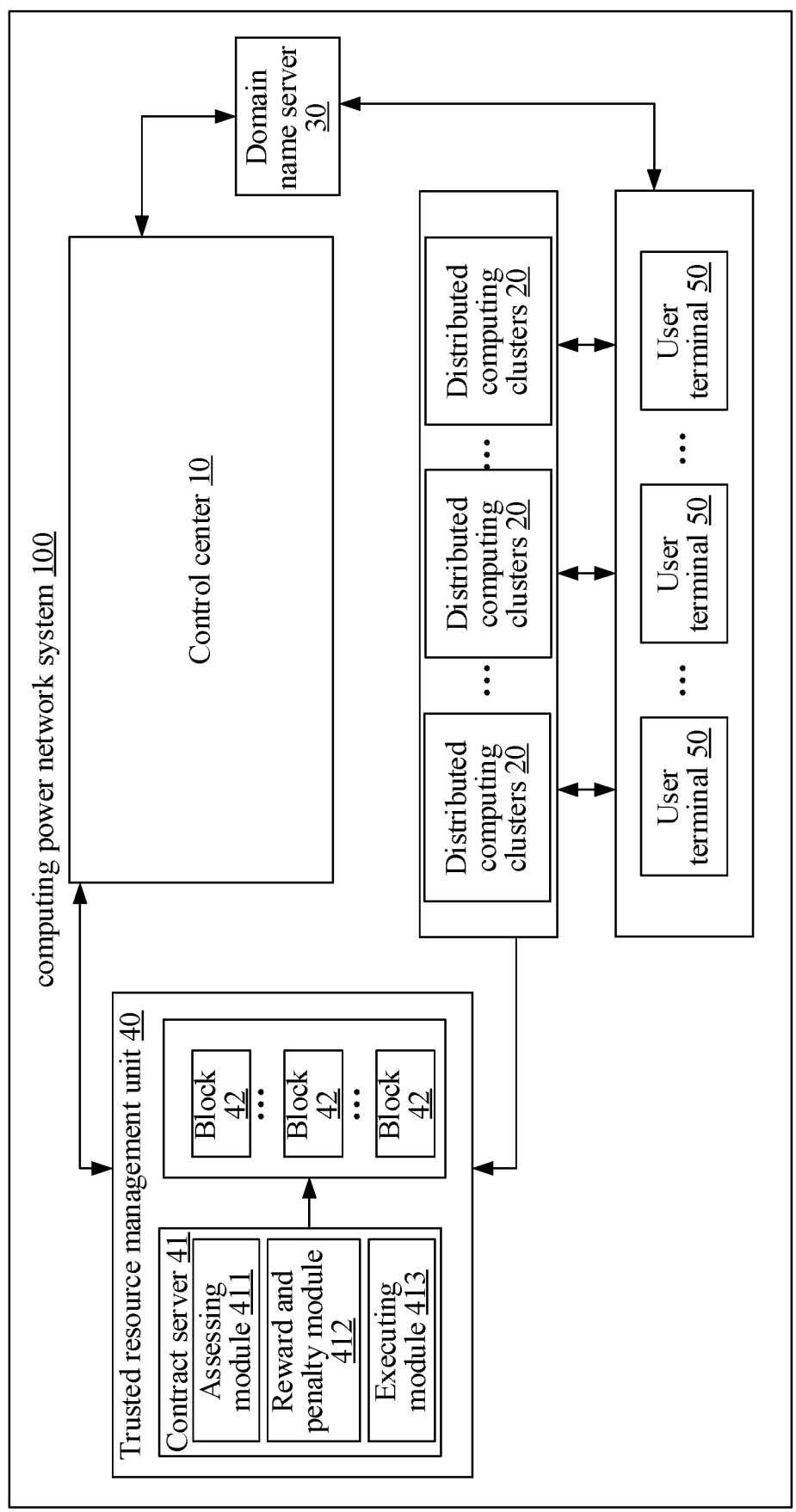
FIG. 1 is a schematic structural diagram of a computing power network system according to an embodiment of the present disclosure.

For clearer descriptions of the objectives, technical solutions, and advantages of embodiments of the present disclosure, the embodiments of the present disclosure are described in detail with reference to accompanying drawings. However, persons of ordinary skill in the art may understand, in the embodiments of the present disclosure, more technical details are provided for readers to better understand the present disclosure. However, even though these technical details and various variations and modifications based on the embodiments hereinafter, the technical solutions of the present disclosure may also be practiced.

As the computing technology and network technology surge, a computing power network is developed, which is a new information infrastructure centering on a computing power, based on network, and providing an integrated service. The goal of the computing power network is to gradually promote the computing power into a social-level service that is accessible at one point and pick and go, like hydropower.

With the in-depth study of the computing power network, it is found that the computing power network still has the following problems:

Different from the traditional cloud computing environment, computing clusters of the computing power network are often distributed at different locations and equipped with heterogeneous hardware and operating systems, and often use different security management mechanisms. This makes the computing power network more vulnerable to data tampering, identity hijacking and other threats. At the same time, with respect to self-organized computing clusters, in one aspect, it is hard to share resource information with each other; and in another aspect, the distribution of computing tasks may be affected by impersonating identity, tampering computing capabilities and providing false services from the perspective of maximizing their own benefits, thus impairing interests of users. Therefore, a traditional centralized trust mechanism has many shortcomings in a decentralized and heterogeneous computing environment, which brings a challenge for the computing power network to provide trusted computing services for users, and it is hard to ensure service credibility.

In addition, a large number of distributed computing clusters are deployed in the computing power network. With respect to different needs on computing tasks of the users, managers often need to configure complex network forms, migrate different computing environments to corresponding edge servers, and carry out cumbersome environment configuration, which significantly increases the difficulty of application development and deployment and maintenance costs. In addition, in the existing distributed cloud computing technology, computing resources are mainly configured in the form of physical machines or virtual machines, and it is difficult to react automatically and flexibly when users' needs increase. Therefore, the scalability of the computing power network is challenged in the application scenario where users' needs change dynamically. Therefore, the computing power network has complex configuration and poor scalability, which is also a problem to be solved.

Figure 2:
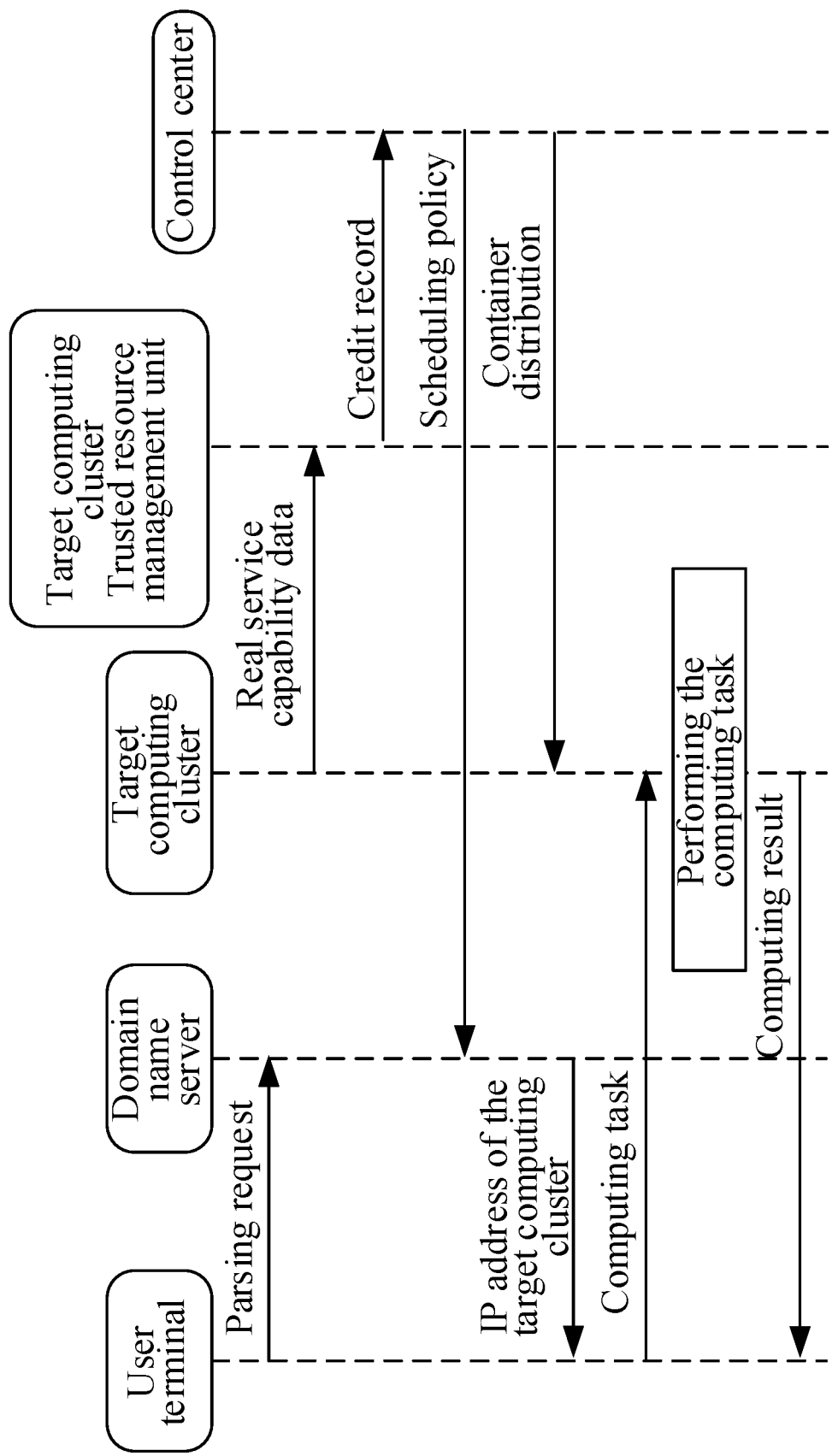
FIG. 2 is an operating flowchart of a computing power network system according to an embodiment of the present disclosure.

As illustrated in FIG. 1 and FIG. 2, an embodiment of the present disclosure provides a computing power network system 100. The computing power network system 100 includes: a control center 10, distributed computing clusters 20, a domain name server 30, and a trusted resource management unit 40. The trusted resource management unit 40 includes: a contract server 41 and a plurality of blocks 42; wherein the control center 10 is configured to provide a service interface for a user terminal 50, and determine a scheduling policy for the distributed computing clusters 20; the domain name server (DNS) 30 is configured to receive a parsing request sent by the user terminal 50 over the service interface, and determine, based on the parsing request and the scheduling policy, an IP address of a target computing cluster, in the distributed computing clusters 20, configured to perform a computing task of the user terminal 50, such that the user terminal 50 sends the computing task to the target computing cluster over the service interface; the target computing cluster in the distributed computing clusters 20 is configured to perform the computing task, and return a computing result to the user terminal 50; each computing cluster in the distributed computing clusters 20 is configured to uploads real service capability data thereof to the contract server 41, and the contract server 41 includes an assessing module 411, a reward and penalty module 412, and an executing module 413, wherein the assessing module 411 is configured to determine whether to acquire an assessment indicator for an credit reward or credit penalty upon completion of a computing task by one of the computing clusters, the reward and penalty module 412 is configured to determine a variation degree of a cluster credit value of the computing cluster based on the real service capability data, and the executing module 413 is configured to generate, based on the assessment indicator and the variation degree of the cluster credit value, a credit assessment of the computing cluster in performing the computing task, and send the credit assessment to the plurality of blocks 42 to store a credit record of the computing cluster; and the control center 10 is further configured to acquire the credit record from the plurality of blocks 42 to identify credit of the computing cluster.

The computing cluster may include one or more computing servers.

The existing cloud computing takes the distributed computing clusters as separated individuals, and the computing power network has many computing nodes, a large amount of data and strong dynamicity. The traditional computing methods based on physical machines or virtual machines result in complex environment configuration and poor scalability of the system. According to the embodiments of the present disclosure, the serverless technology is employed in as an overall framework of a computing system, and underlying computing resources are uniformly virtualized; the whole computing power network has a unified open interface and is open to users; the users only need to submit tasks over the unified interface and may acquire computing resources allocated according to needs and elastic expansion capabilities, with no need of managing the underlying complex infrastructure of the network. In this way, the complexity of the configuration of the computing power network system is lowered, and the network and computing resources are flexibly and efficiently scheduled by a control center.

In the related art, in centralized resource management, all monitoring data and control signals are stored in or and forwarded by a central server. By attacking the weak links in the centralized architecture, illegal users may invade the network and cause threats on the network security. Due to distributed computing characteristics, the computing power network is more vulnerable to network attacks. According to the embodiments of the present disclosure, a trust model running in a smart contract is established based on a distributed trust mechanism of the block chain technology, and an identity and resource information about a computing cluster are stored and verified. By a distributed consensus mechanism, it is ensured that data is not tampered, the real service capability of the computing cluster is identified, and the honest service of the computing cluster (namely, a computing node) is ensured, such that the computing resources acquired by the user is secure and credible, the data security is ensured, and the credibility of the computing power network is enhanced.

In some embodiments, the service interface is a uniform resource locator (URL) interface. A uniform service interface is presented to a user in the form of a URL, and where the user has a computing request, the URL interface is called to initiate a parsing request to the DNS. The DNS has a smart parsing function and returns an IP address of the nearest computing cluster, and the user finally initiates the computing request to the computing cluster. In particular, the DNS may adaptively provide an address of the nearest computing cluster to the user according to a location of the user, and provide a low-latency trusted computing service.

The specific functions of the assessing module, the reward and penalty module, and the executing module in the contract server are described below.

In some embodiments, the assessing module is configured to calculate the assessment indicator $\alpha_t$ using formula (1):

$$\hat{\alpha}_t = \text{sgn}(\Sigma_{n \in s_t} \alpha_{n,t})$$

$$\text{sgn}(x) = -1 \text{ if } x<0, \text{ and } 1 \text{ otherwise.} \quad (1)$$

wherein t represents an index number of the computing task, n represents an index number of the computing cluster, $s_t$ represents a set of the computing clusters undertaking the computing task t, $\alpha_{n,t}$ represents a completion quality of the computing task upon completion of the computing task t by the computing cluster n, x represents trust of the computing cluster, $x \in [0, 1]$; $\hat{\alpha}_t$ represents an estimated value of $\alpha_t$; and where $\alpha_{n,t} = \alpha_t$, the assessing module is configured to determine that a credit reward is to be given to the computing cluster, and otherwise, determine that a credit penalty is to be given to the computing cluster. It is understood that sgn is a signed function, which indicates the sign of a parameter when an integer variable is returned.

In some embodiments, the reward and penalty module is configured to calculate the variation degree of the cluster credit value as follows:

let x represent the trust of the computing cluster, $x \in [0, 1]$, $e(x)$ represent an expected value of the cluster credit value, and c represent a probability that the completion quality of the computing task is determined as qualified, then an increment when the cluster credit value increases is $r(x)$ and $r(x)>0$, and a decrement when the cluster credit value decreases is $p(x)$ and $p(x)>0$, $$e(x)=c \times r(x)-(1-c) \times p(x) \quad (2);$$

a reward and penalty model of the computing cluster is:

$$\begin{cases} \text{argmax}_x e(x) = c \\ \langle r, p \rangle \geq 0, \left\langle \frac{\partial r}{\partial x}, \frac{\partial p}{\partial x} \right\rangle > 0 \\ r(0.5) = p(0.5) = 0, r(1) = 1 \\ 0.5 \leq x \leq 1 \end{cases} \quad (3)$$

It can be seen from the above formula that a computing cluster needs to faithfully submit its real service capability to the system so as to maximize its reputation evaluation. During each reputation adjustment, x is positively correlated to r or the value of p. That is, the existing credit value may exert a positive impact on a final decision value.

a reward and penalty function is acquired by solving the reward and penalty model (3):

$$\begin{cases} r_k(x) = \frac{-(k-1)2^k x^k + 2^k k x^{k-1} - (k+1)}{2^k - k - 1} \\ p_k(x) = \frac{(k-1)2^k x^k - (k-1)}{2^k - k - 1} \end{cases} \quad (4)$$

wherein k represents a ranking of the reward and penalty function corresponding to the computing cluster, k is an integer and $k \geq 2$, and a function, that is, an expected credit function, of the variation degree of the cluster credit value of the computing cluster ranked at a k position is acquired by introducing formula (4) into formula (2):

$$e_k(c) = \frac{2^k c^k - 2ck + k - 1}{2^k - k - 1}. \quad (5)$$

In some embodiments, the executing module is configured to calculate the credit assessment $\alpha^*_t$ of the computing task t using formula (6):

$$\alpha^*_t = \text{sgn}(\Sigma_{n \in s_t} e_{n,t} \alpha_{n,t})$$

$$\text{sgn}(x) = -1 \text{ if } x < 0, \text{ and } 1 \text{ otherwise.} \quad (6)$$

wherein $e_{n,t}$ represents the variation degree of the cluster credit value of the computing cluster.

$\alpha^*_t$ defined in the above formula is similar to the weighted regression criterion in a crowd packet model. An accurate determination conclusion may be reached even in the case that most of the computing clusters fail to provide their own service quality honestly. The above formula features incentive compatibility. That is, the best way to calculate the maximize its own revenue of the cluster is to faithfully declare its real service capability.

It will be appreciated that the above data in the contracts is stored in a form and that the main functions of each contract include insertion, deletion, calculation, and query.

In some embodiments, the contract server further includes: an identity contract module, configured to register the computing clusters and maintain an identity list of the computing clusters, and send the identity list to the plurality of blocks for storage of the identity list; and the control center is further configured to acquire the identity list from the plurality of blocks to complete identification and authentication of the computing cluster.

In this way, an identity contract is set up to maintain an identity list of computing cluster identities and complete the identification and verification of computing cluster identities. Implementing the identity function as a separate contract reduces the complexity of contract system, and improves the modularity and response speed in large-scale concurrent processing.

In some embodiments, the controller center includes: a controller, a distributor, and a code library; wherein a container running environment is installed on each of computing servers in the distributed computing clusters; a container for performing the computing task is stored in the code library; the controller is configured to determine the container orchestration policy and a scheduling policy of the distributed computing clusters, and control the distributor to distribute the container from the code library to the distributed computing clusters; and the target computing cluster is configured to download, install, and run a target container for performing the computing task from the code library based on the container orchestration policy.

A containerized computing platform may be built via an Openwhisk computing architecture, a container running environment may be installed for each computing cluster, and the running environment between heterogeneous computing clusters may be opened via the container by performing fine-grained scheduling on the computing environment, such that the running environment is highly compatible, fine-grained allocation of computing resources is provided, and elastic expansion of the computing environment is achieved. The algorithms or programs for the computing clusters to perform computing tasks may be encapsulated by means of Docker, and dynamically distributed to the edge computing clusters according to user demands. Users only need to upload computing task data and other relevant information over the unified interface provided by the system, and thus submit computing tasks. The control center may orchestrate and deploy relevant containers to a suitable target computing cluster according to information such as task attributes and network traffic, and download, install and run containers required by a computing task from a code library according to a container arrangement policy of the control center. The computing cluster finally returns a calculation result to the user.

By combining the above-mentioned methods with the container technology, the computing cluster may directly open plurality of independent user-state space instances to the users at the operating system level and support packages and software libraries, such that it is not necessary to allocate a large number of virtual machine resources to each user. At the same time, migration of containers between different computing entities is supported, which greatly simplifies the deployment difficulty of application development. That is, one-touch distribution and dynamic migration of computing functions are implemented by the container technology, the complexity of system configuration is lowered, and the dynamic expansion and elastic expansion of resources are achieved.

In some embodiments, the domain name server is further configured to generate a mapping instruction for mapping between the user terminal and the target computing cluster; and the target computing cluster is configured to determine, based on the mapping instruction, the user terminal receiving the computing result, and directly return the computing result to the determined user terminal. In this way, the computing cluster has the functions of receiving the mapping instruction of the DNS and binding with the corresponding user, and thus direct data communication with the user is implemented.

In some embodiments, the target computing cluster is further configured to: determine, in response to receiving the computing task, whether a target container for performing the computing task is stored on the target computing cluster; perform the computing task and returning the computing result to the user terminal in response to determining that the target container for performing the computing task is stored on the target computing cluster; and acquire the target container from the code library in response to determining that the target container for performing the computing task is not stored on the target computing cluster.

In some embodiments, before the user terminal sends the computing task to the target computing cluster over the service interface, the controller is further configured to: send a container download instruction to one or more of the distributed computing clusters, wherein the container download instruction is defined to instruct the computing cluster to download and install, from the code library, the container matching the computing task typically performed by the computing cluster; and the target computing cluster is further configured to download and install the target container from the code library based on the container download instruction.

The embodiments described above are primarily intended to meet the needs of dynamic scenarios. When a user accesses an edge node, where a computing environment is found, a result is directly returned; and otherwise, a computing cluster needs to pull a corresponding computing environment to a centralized code library. In addition, a user or a network administrator may push a computing environment to a suitable computing cluster in advance, such that the user hits the corresponding computing environment when accessing the edge node, and the access delay is reduced.

Further, the resource utilization and computational efficiency of the existing computing power networks are not high. A computing power network typically provides computing services for multiple users for different applications that have different demands on communication resources and computing resources. However, the existing resource arrangement methods rely on user self-management or simple optimization algorithms to allocate computing units with coarse granularity of physical machines or virtual machines, which results in low resource utilization. Typical servers in commercial and enterprise data centers currently provide only 5% to 15% of an average maximum processing capacity output. This results in that the computing resources of the system are not fully utilized, and additionally the computing requests of the users are not satisfied due to the inefficiency of the resource scheduling method. Therefore, it is challenging to provide efficient computing services to the users. Therefore, the embodiments of the present disclosure also provide a technical solution for improving the computational efficiency. In some embodiments, the control center determines the scheduling policy of the distributed computing clusters by:

acquiring first encrypted information of an initial global computing cluster orchestration model, and sending the first encrypted information to each of the computing clusters, wherein the first encrypted information is defined to update a local computing cluster orchestration model of each of the computing clusters;

receiving second encrypted information of the updated local computing cluster orchestration model returned by each of the computing cluster; and acquiring a new global computing cluster orchestration model by updating the initial global computing cluster orchestration model based on all the second encrypted information.

Based on the above, the resource orchestration method based on federated learning is adopted to solve the contradiction between information isolation among computing clusters and global optimization requirements, improve the orchestration efficiency, minimize the task computing delay while maximizing the resource utilization, optimize the response speed, and improve the computing efficiency.

Acquiring the new global computing cluster orchestration model by updating the initial global computing cluster orchestration model based on all the second encrypted information includes:

acquiring updated information of each of the computing clusters by decrypting the second encrypted information in accordance with a predetermined decryption rule; and acquiring the new global computing cluster orchestration model by updating the initial global computing cluster orchestration model based on all the updated information.

The initial global computing cluster orchestration model is trained by:

acquiring a first sample training set, wherein the first sample training set includes history task information and a computing cluster orchestration policy label corresponding to the history task information; and acquiring the initial global computing cluster orchestration model by updating the initial global computing cluster orchestration model based on the first sample training set.

The first sample training set further includes: predetermined task information of a particular situation, and a computing cluster orchestration policy label corresponding to the predetermined task information of the particular situation.

Upon acquiring the new global computing cluster orchestration model by updating the initial global computing cluster orchestration model based on all the second encrypted information, the control center is further configured to:

send, in response to receiving a model information acquisition request from the computing cluster, the new global computing cluster orchestration model and/or third encrypted information corresponding to the new global computing cluster orchestration model to the computing cluster.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that modifications may still be made to the technical solutions described in the above embodiments, or equivalent replacements may be made to some of the technical features; however, such modifications or replacements do not cause the essence of the corresponding technical solutions to depart from the spirit and scope of the technical solutions of the embodiments of the present disclosure.

What is claimed is:

1. A computing power network system, comprising:
   a control center;
   distributed computing clusters;
   a domain name server; and
   a trusted resource management unit, comprising a contract server and a plurality of blocks; wherein
   the control center is configured to provide a service interface for a user terminal, and determine a scheduling policy for the distributed computing clusters;
   the domain name server is configured to receive a parsing request sent by the user terminal over the service interface, and determine, based on the parsing request and the scheduling policy, an IP address of a target computing cluster, in the distributed computing clusters, configured to perform a computing task of the user terminal, such that the user terminal sends the computing task to the target computing cluster over the service interface;
   the target computing cluster in the distributed computing clusters is configured to perform the computing task, and return a computing result to the user terminal;
   each computing cluster in the distributed computing clusters is configured to uploads real service capability data thereof to the contract server, and the contract server comprises an assessing module, a reward and penalty module, and an executing module, wherein the assessing module is configured to determine whether to acquire an assessment indicator for a credit reward or credit penalty upon completion of a computing task by one of the computing clusters, the reward and penalty module is configured to determine a variation degree of a cluster credit value of the computing cluster based on the real service capability data, and the executing module is configured to generate, based on the assessment indicator and the variation degree of the cluster credit value, a credit assessment of the computing cluster in performing the computing task, and send the credit assessment to the plurality of blocks to store a credit record of the computing cluster; and
   the control center is further configured to acquire the credit record from the plurality of blocks to identify credit of the computing cluster.

2. The computing power network system according to claim 1, wherein the assessing module is configured to calculate the assessment indicator $\alpha_t$ using formula (1):

$$\hat{\alpha}_t = \text{sgn}(\Sigma_{n \in s_t} \alpha_{n,t}) \quad (1)$$

$$\text{sgn}(x) = -1 \text{ if } x < 0, \text{ and } 1 \text{ otherwise}$$

wherein t represents an index number of the computing task, n represents an index number of the computing cluster, $s_t$ represents a set of the computing clusters undertaking the computing task t, $\alpha_{n,t}$ represents a completion quality of the computing task upon completion of the computing task t by the computing cluster n, x represents trust of the computing cluster, $x \in [0, 1]$; $\hat{\alpha}_t$ represents an estimated value of $\alpha_t$; and
where $\alpha_{n,t} = \alpha_t$, the assessing module is configured to determine that a credit reward is to be given to the computing cluster, and otherwise, determine that a credit penalty is to be given to the computing cluster.

3. The computing power network system according to claim 2, wherein the reward and penalty module is configured to calculate the variation degree of the cluster credit value as follows:
   let x represent the trust of the computing cluster, $x \in [0, 1]$, e(x) represent an expected value of the cluster credit value, and c represent a probability that the completion quality of the computing task is determined as qualified, then an increment when the cluster credit value increases is r(x) and r(x)>0, and a decrement when the cluster credit value decreases is p(x) and p(x)>0, $$e(x) = c \times r(x) - (1-c) \times p(x) \quad (2);$$

a reward and penalty model of the computing cluster is:

$$\begin{cases} r_k(x) = \dfrac{-(k-1)2^k x^k + 2^k k x^{k-1} - (k+1)}{2^k - k - 1} \\ p_k(x) = \dfrac{(k-1)2^k x^k - (k-1)}{2^k - k - 1} \end{cases} \quad (3)$$

a reward and penalty function is acquired by solving the reward and penalty model (3):

$$\begin{cases} r_k(x) = \dfrac{-(k-1)2^k x^k + 2^k k x^{k-1} - (k+1)}{2^k - k - 1} \\ p_k(x) = \dfrac{(k-1)2^k x^k - (k-1)}{2^k - k - 1} \end{cases} \quad (4)$$

wherein k represents a ranking of the reward and penalty function corresponding to the computing cluster, k is an integer and $k \geq 2$, and a function of the variation degree of the cluster credit value of the computing cluster ranked at a k position is acquired by introducing formula (4) into formula (2):

$$e_k(c) = \dfrac{2^k c^k - 2ck + k - 1}{2^k - k - 1}. \quad (5)$$

4. The computing power network system according to claim 3, wherein the executing module is configured to calculate the credit assessment $\alpha^*_t$ of the computing task t using formula (6):

$$a^*_t = \text{sgn}\left(\sum_{n \in s_t} e_{n,t} a_{n,t}\right) \quad (6)$$

$$\text{sgn}(x) = -1 \text{ if } x < 0, \text{ and } 1 \text{ otherwise}.$$

wherein $e_{n,t}$ represents the variation degree of the cluster credit value of the computing cluster.

5. The computing power network system according to claim 1, wherein the contract server further comprises: an identity contract module, configured to register the computing clusters and maintain an identity list of the computing clusters, and send the identity list to the plurality of blocks for storage of the identification list; and the control center is further configured to acquire the identity list from the plurality of blocks to complete identification and authentication of the computing cluster.

6. The computing power network system according to claim 1, wherein the controller center comprises: a controller, a distributor, and a code library; wherein
a container running environment is installed on each of computing servers in the distributed computing clusters;
a container for performing the computing task is stored in the code library;
the controller is configured to determine the container orchestration policy and a scheduling policy of the distributed computing clusters, and control the distributor to distribute the container from the code library to the distributed computing clusters; and
the target computing cluster is configured to download, install, and run a target container for performing the computing task from the code library based on the container orchestration policy.

7. The computing power network system according to claim 1, wherein the domain name server is further configured to generate a mapping instruction for mapping between the user terminal and the target computing cluster; and
the target computing cluster is configured to determine, based on the mapping instruction, the user terminal receiving the computing result, and directly return the computing result to the determined user terminal.

8. The computing power network system according to claim 1, wherein the target computing cluster is further configured to:
determine, in response to receiving the computing task, whether a target container for performing the computing task is stored on the target computing cluster;
perform the computing task and returning the computing result to the user terminal in response to determining that the target container for performing the computing task is stored on the target computing cluster; and
acquire the target container from the code library in response to determining that the target container for performing the computing task is not stored on the target computing cluster.

9. The computing power network system according to claim 1, wherein before the user terminal sends the computing task to the target computing cluster over the service interface, the controller is further configured to:
send a container download instruction to one or more of the distributed computing clusters, wherein the container download instruction is defined to instruct the computing cluster to download and install, from the code library, the container matching the computing task typically performed by the computing cluster; and
the target computing cluster is further configured to download and install the target container from the code library based on the container download instruction.

10. The computing power network system according to claim 1, wherein the service interface is a URL interface.

11. The computing power network system according to claim 1, wherein the control center determines the scheduling policy of the distributed computing clusters by:
acquiring first encrypted information of an initial global computing cluster orchestration model, and sending the first encrypted information to each of the computing clusters, wherein the first encrypted information is defined to update a local computing cluster orchestration model of each of the computing clusters;
receiving second encrypted information of the updated local computing cluster orchestration model returned by each of the computing cluster; and
acquiring a new global computing cluster orchestration model by updating the initial global computing cluster orchestration model based on all the second encrypted information.

12. The computing power network system according to claim 11, wherein acquiring the new global computing cluster orchestration model by updating the initial global computing cluster orchestration model based on all the second encrypted information comprises:
acquiring updated information of each of the computing clusters by decrypting the second encrypted information in accordance with a predetermined decryption rule; and
acquiring the new global computing cluster orchestration model by updating the initial global computing cluster orchestration model based on all the updated information.

13. The computing power network system according to claim 11, wherein the initial global computing cluster orchestration model is trained by:
acquiring a first sample training set, wherein the first sample training set comprises history task information and a computing cluster orchestration policy label corresponding to the history task information; and
acquiring the initial global computing cluster orchestration model by updating the initial global computing cluster orchestration model based on the first sample training set.

14. The computing power network system according to claim 13, wherein the first sample training set further comprises: predetermined task information of a particular situation, and a computing cluster orchestration policy label corresponding to the predetermined task information of the particular situation.

15. The computing power network system according to claim 11, wherein upon acquiring the new global computing cluster orchestration model by updating the initial global computing cluster orchestration model based on all the second encrypted information, the control center is further configured to:
send, in response to receiving a model information acquisition request from the computing cluster, the new global computing cluster orchestration model and/or third encrypted information corresponding to the new global computing cluster orchestration model to the computing cluster.

* * * * *